United States Patent
Kuhr (10) Patent No.: US 7,506,916 B2
(45) Date of Patent: Mar. 24, 2009

(54) MOTOR VEHICLE COMPRISING A DISPLACEABLE ROOF SECTION

(75) Inventor: Jürgen Kuhr, Osnabrück (DE)

(73) Assignee: Wilhelm Karmann GmbH, Osnabruck (DE)

( * ) Notice: Subject to any disclaimer, the term of this patent is extended or adjusted under 35 U.S.C. 154(b) by 370 days.

(21) Appl. No.: 10/568,425

(22) PCT Filed: Aug. 6, 2004

(86) PCT No.: PCT/DE2004/001772

§ 371 (c)(1),
(2), (4) Date: Feb. 14, 2006

(87) PCT Pub. No.: WO2005/016677

PCT Pub. Date: Feb. 24, 2005

(65) Prior Publication Data

US 2006/0284443 A1 Dec. 21, 2006

(30) Foreign Application Priority Data

Aug. 14, 2003 (DE) ................. 103 37 575

(51) Int. Cl.
*B60J 7/047* (2006.01)
*B60J 7/08* (2006.01)
*B60J 7/11* (2006.01)

(52) U.S. Cl. ............... 296/107.2; 296/107.17; 296/203.03; 296/218; 384/52

(58) Field of Classification Search ........... 296/107.16, 296/107.17, 107.19, 107.2, 203.03, 218, 296/220.01; 384/50, 52, 53, 55, 58
See application file for complete search history.

(56) References Cited

U.S. PATENT DOCUMENTS 735,200 A * 8/1903 Black .................. 384/50

(Continued)

FOREIGN PATENT DOCUMENTS

DE  4326291 A1 *  9/1994

(Continued)

*Primary Examiner*—Glenn Dayoan
*Assistant Examiner*—Paul A Chenevert
(74) *Attorney, Agent, or Firm*—Rothwell, Figg, Ernst & Manbeck, P.C.

(57) ABSTRACT

A motor vehicle includes at least one displaceable roof section, which when closed abuts the windscreen frame at the front of the vehicle and whose lateral outer areas respectively abut a support. The supports can be relocated in lateral columns of the windscreen frame, where the ends of the supports at the front of the vehicle and the section of the supports lying in the exit region of the lateral column are guided without play in a housing channel that is formed by the respective lateral column, by a respective roller bearing, at a defined distance from the wall of the receiving channel. An optimized guidance system and stability are achieved., if the end of the support at the rear of the vehicle is held in a central manner in a locking device on a rear roof section. The locking device is configured with a cylindrical fastening element comprising a centering recess, in which a rocker-mounted locking lever, designed to engage in a cavity of the support, is located. Alternatively, a longitudinal slide element, which is connected to a snap-in element, can be located in the fastening element. When displaced, the slide element causes the snap-in element to engage in a snap-in cavity on the support or releases the cavity.

27 Claims, 8 Drawing Sheets

U.S. PATENT DOCUMENTS

| | | | |
|---|---|---|---|
| 1,541,791 A * | 6/1925 | Christofferson | 384/52 |
| 1,688,867 A * | 10/1928 | Heintz | 296/210 |
| 3,582,161 A * | 6/1971 | Hudson | 384/51 |
| 3,749,455 A * | 7/1973 | Meier | 384/53 |
| 4,367,454 A * | 1/1983 | Modica | 340/426.34 |
| 4,869,549 A * | 9/1989 | Londeck et al. | 296/224 |
| 5,009,465 A * | 4/1991 | Induni | 296/219 |
| 5,078,447 A * | 1/1992 | Klein et al. | 296/107.2 |
| 5,209,544 A | 5/1993 | Benedetto et al. | |
| 6,585,310 B1 * | 7/2003 | Guillez et al. | 296/108 |
| 6,764,124 B2 * | 7/2004 | Tohda et al. | 296/96.12 |
| 2002/0097926 A1 * | 7/2002 | Mochizuki | 384/58 |

FOREIGN PATENT DOCUMENTS

| | | |
|---|---|---|
| DE | 19834186 A1 * | 2/1999 |
| DE | 202 01 411 U | 5/2002 |
| DE | 10202763 A1 * | 8/2003 |
| DE | 102 12 573 A1 | 10/2003 |
| DE | 102 12 574 A1 | 10/2003 |
| DE | 10340686 A1 * | 3/2005 |
| FR | 1 370 077 A | 8/1964 |
| GB | 464 360 A | 4/1937 |
| GB | 644 045 A | 10/1950 |
| JP | 61211130 A * | 9/1986 |
| JP | 05238424 A * | 9/1993 |
| JP | 2002178762 A * | 6/2002 |

* cited by examiner

MOTOR VEHICLE COMPRISING A DISPLACEABLE ROOF SECTION

CROSS REFERENCE TO RELATED APPLICATION

This application is a 35 U.S.C. §371 National Phase Entry Application from PCT/DE2004/001772, filed Aug. 6, 2004, and designating the United States.

BACKGROUND OF THE INVENTION

1. Field of the Invention

The invention relates to a motor vehicle comprising at least one displaceable roof section, which when closed abuts a windshield frame at the front of the vehicle and whose lateral outer areas respectively abut a support, with the supports being at least partly relocatable in lateral columns of the windshield frame to form an open roof section.

2. Description of the Related Art

DE 202 01 411 UI discloses a motor vehicle of this type, which can be developed as a convertible or a Targa vehicle, for example. With said motor vehicle, the supports, which can be relocated in the lateral columns of the windshield frame, offer a stable support for at least one displaceable roof section when the motor vehicle is closed. When the top is open after the roof section was removed either manually or stored in the rear area of the vehicle by a joint mechanism, said supports reinforce the lateral columns of the windshield frame, thus offering increased protection to the passengers when the windshield frame is bearing the load of the vehicle, as can be the case in a rollover.

With said vehicle, there is room for improvement in the guidance system of the supports when they move between a first end position in a state when they are recessed in the lateral column of the windshield frame, and a second end position at a rear roof section when the roof of the motor vehicle is closed. For one, the proposed development of the A-columns of the windshield frame having a receiving channel with dimensions which essentially correspond exactly to the cross-orientation of the supports bears the risk of a so-called "drawer effect", i.e., a tilting of the supports on both sides when they are displaced between two end positions, and on the other hand, the stability of the roof frame construction is limited here with lateral supports abutting the rear roof section, as proposed.

Therefore, the problem to be solved by the present invention with a motor vehicle of the type described above is to provide an improved mechanism for the displacement of the lateral supports between their end positions with respect to protection against jamming and stability of the roof section.

BRIEF SUMMARY OF THE INVENTION

In accordance with the invention, this objective is attained by a motor vehicle with the end of the supports in the area at the front of the vehicle being guided in a receiving channel formed by the assigned lateral column of the windshield frame, and in the exit region at the upper end of the lateral column by a respective roller bearing without play and at a defined distance from the wall of the receiving channel.

In accordance with the invention, the roller bearing of the supports in the lateral columns of the windshield frame advantageously counteracts the so-called "drawer effect" and ensures a problem-free synchronous displacement of the supports arranged on both sides of the windshield frame between their end positions.

Furthermore, the object of the invention is attained with the development of a motor vehicle, which provides the support at the rear of the vehicle to be held in a central manner in a locking device at a rear roof section, and with said locking device being designed with a cylindrical fastening element comprising a centering recess in which a rocker-mounted locking lever is arranged, which is designed to engage in a recess at the end of the support at the rear of the vehicle in locking position.

This development of the contact area between the lateral support and the abutting roof section when the roof section is closed allows a secure detention of the lateral support at the rear roof section in a constructively simple manner, which increases the stability of the roof when the top is closed.

The same is achieved with an alternate design by arranging a longitudinal slide element, which is connected to a snap-in element, in the cylindrical fastening element of the locking means. When said longitudinal slide element is displaced, the snap-in element engages in a snap-in recess at the end of the support at the rear end of the vehicle or releases the same.

An especially secure guidance system of the supports between their end positions is achieved by the combination of a roller bearing of the supports in the lateral columns of the windshield frame and a centered guidance system and locking of the supports at the rear roof element.

Other advantages and advantageous developments of the object of the invention can be found in the description, the figures and the patent claims.

Two embodiments of a motor vehicle designed in accordance with the invention are shown in a simplified schematic representation in the figures and explained in greater detail in the following.

DETAILED DESCRIPTION OF THE INVENTION

Figure 1:
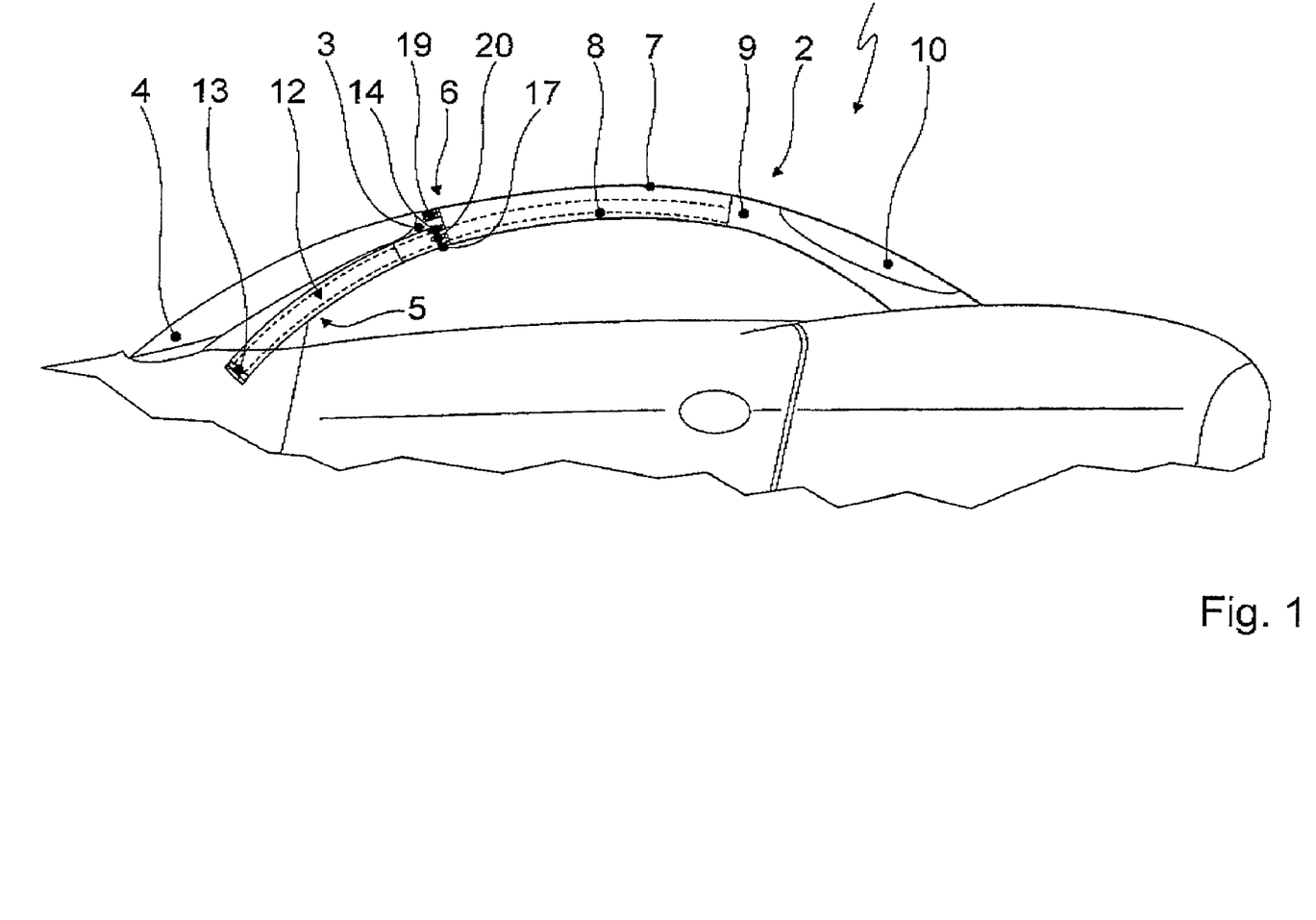
FIG. 1 a motor vehicle in accordance with the invention, in "Targa" construction method with closed roof represented schematically in a lateral view.
Figure 2:
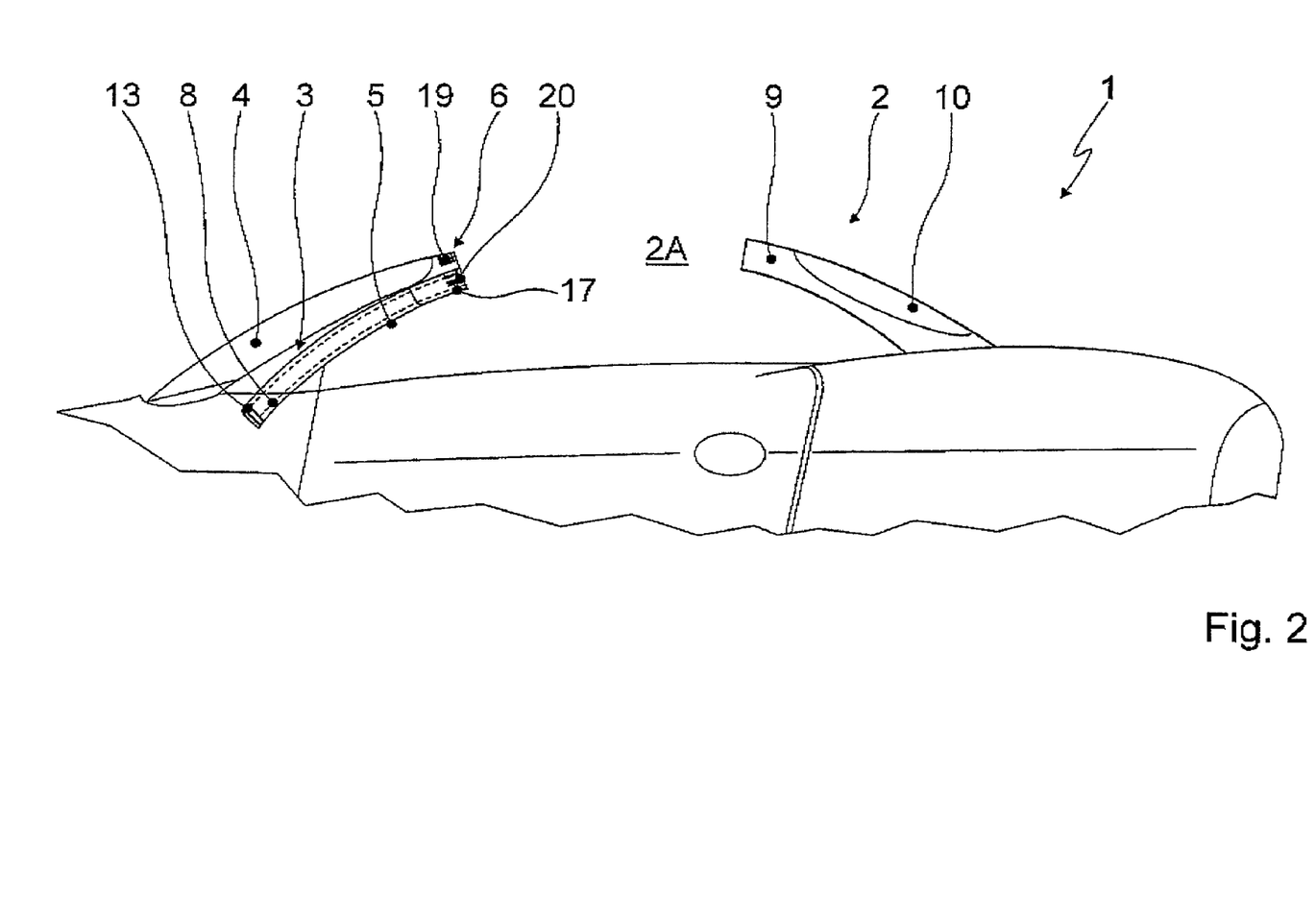
FIG. 2 the motor vehicle in accordance with FIG. 1 with the roof open.
Figure 3:
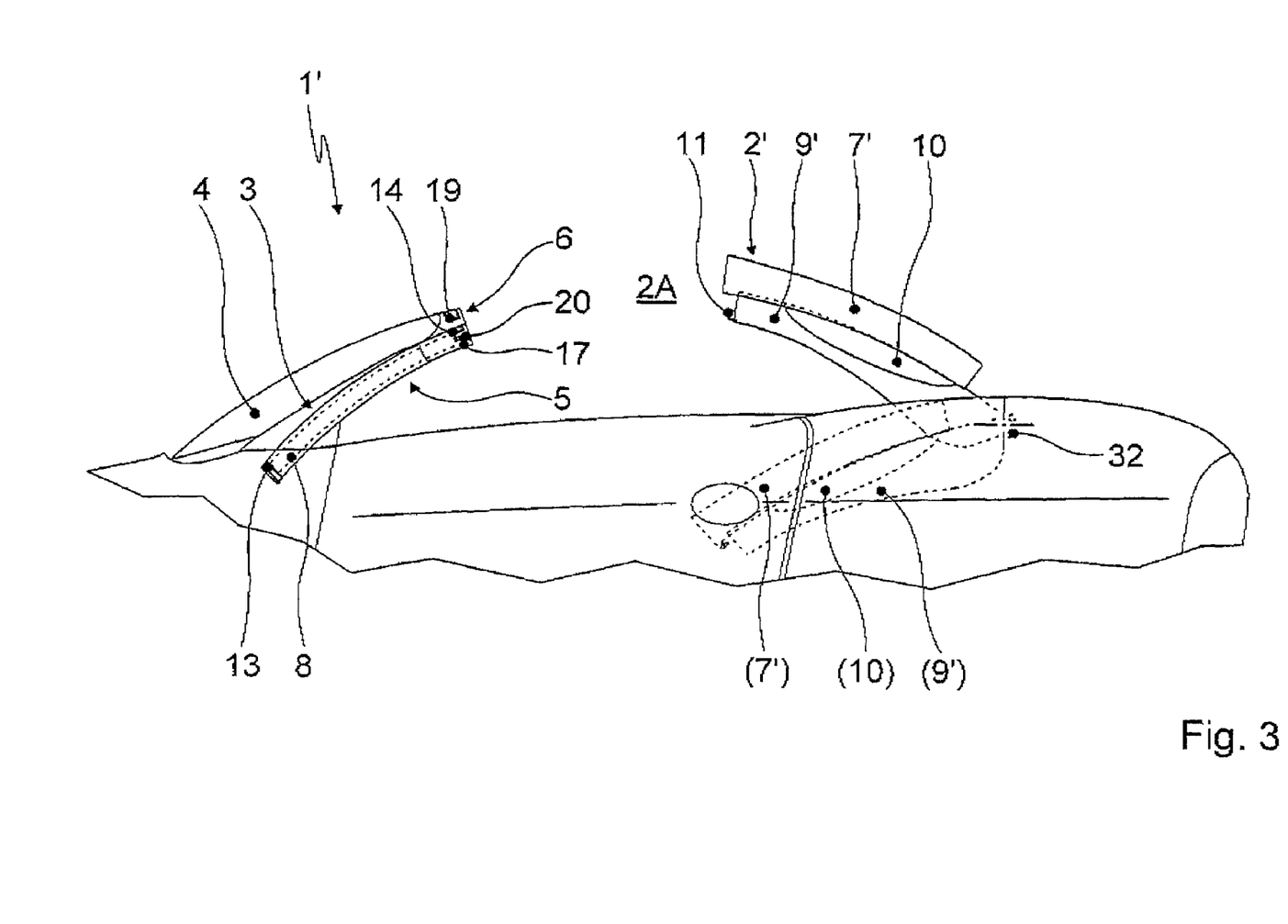
FIG. 3 a diagram of the lateral view of an additional motor vehicle in accordance with the invention in convertible construction with a roof cover that can be completely stored in a storage housing in the rear area of the vehicle, which is shown in FIG. 3 in two different positions during the opening- or closing process.

The FIGS. 1 to 3 show sections of a motor vehicle 1 having a roof 2. When the roof 2 is closed, it abuts a windshield frame 3 at the front of the vehicle, which encompasses a windshield 4 and comprises lateral columns 5 and an upper cross-frame part 6, which form the A-columns of the motor vehicle 1.

The present roof 2 has a movable roof section 7 which, when the roof 2 is closed, abuts lateral supports 8 which stabilize the roof 2. At the rear, the movable roof section 7 connects to a rear roof section 9.

In the embodiment according to FIG. 1 and FIG. 2, where the motor vehicle 1 is developed in the "Targa" construction method, the rear roof section 9 is arranged rigidly and developed with a rear window 10. The moveable roof section 7, which can be of metal or plastic or acrylic glass or the like, can be removed completely here manually to form an open roof section 2. After the movable center roof section 7 has been removed and thus leaves a roof opening 2A, the lateral supports 8, which are now no longer needed, can be lowered into the lateral columns 5 of the windshield frame 3 by opening a locking means 11 in its contact area with the rear roof section 9.

Figure 4:
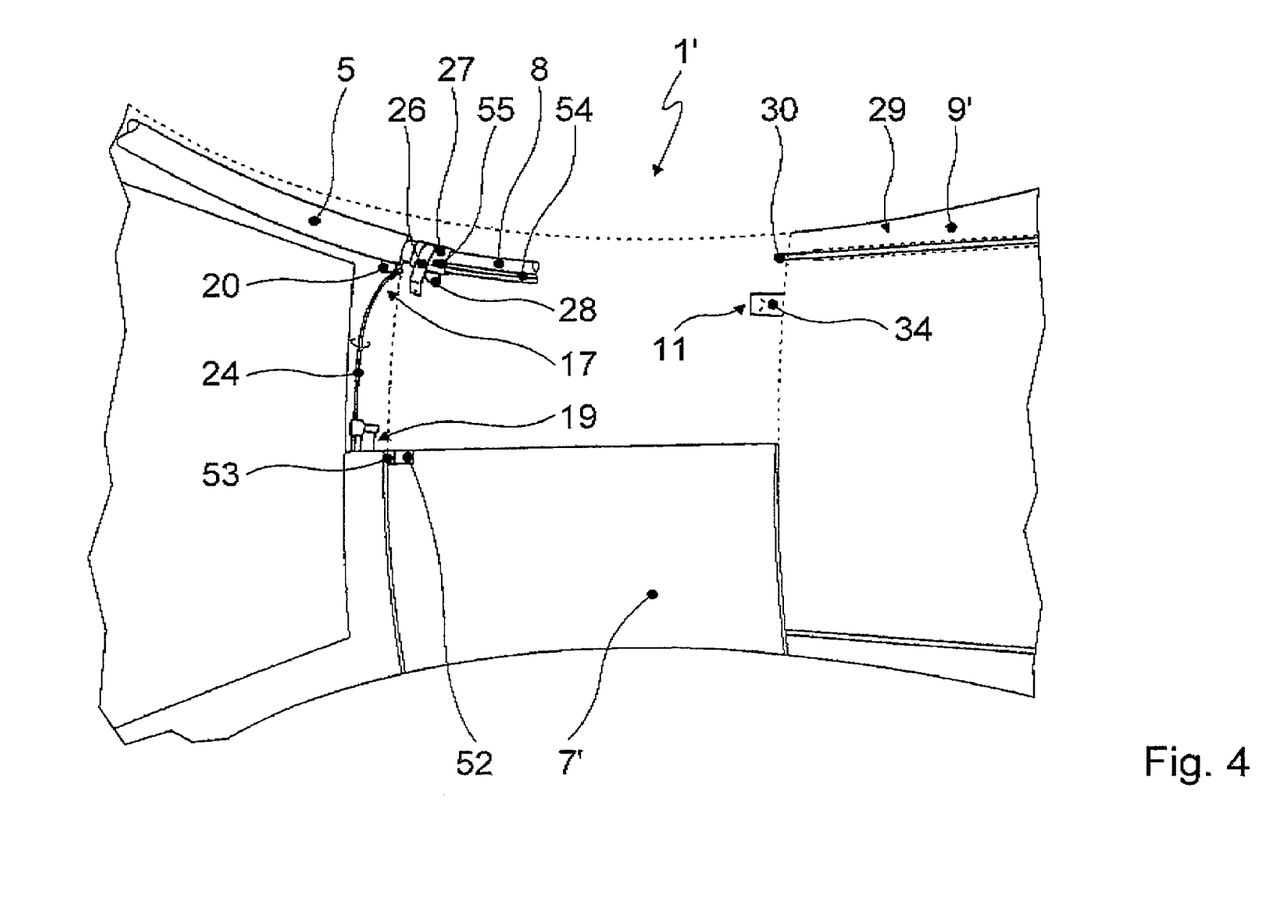
FIG. 4 a partially opened top view of the vehicle in accordance with FIG. 3.

The FIGS. 3 and 4 show anther development of a motor vehicle 1' configured as a convertible. Here, the movable roof section 7' slides over the rear roof section 9' during the opening movement of the roof 21 and then both roof sections 7', 9' are displaced downward around a common pivot axis 32 located at the rear of the motor vehicle 1' and into a housing. Any arbitrary known lever mechanism can be used for this purpose.

It goes without saying that alternate embodiments of the two configurations of the motor vehicle 1 and/or 1' shown above may also provide a plurality of movable roof sections, and that the rear roof section can comprise a plurality of segments.

In the shown embodiments, the lateral columns 5 form a respective receiving channel 12 to accommodate the support 8 when the roof 2 and/or 2' is open, with the end of said respective support 8 being guided at the front of the vehicle by a first roller bearing 13 and in the area of its exit region from the upper end of the lateral column 5 by a second roller bearing 14 without play and at a defined distance to the wall of the receiving channel 12.

Figure 6:
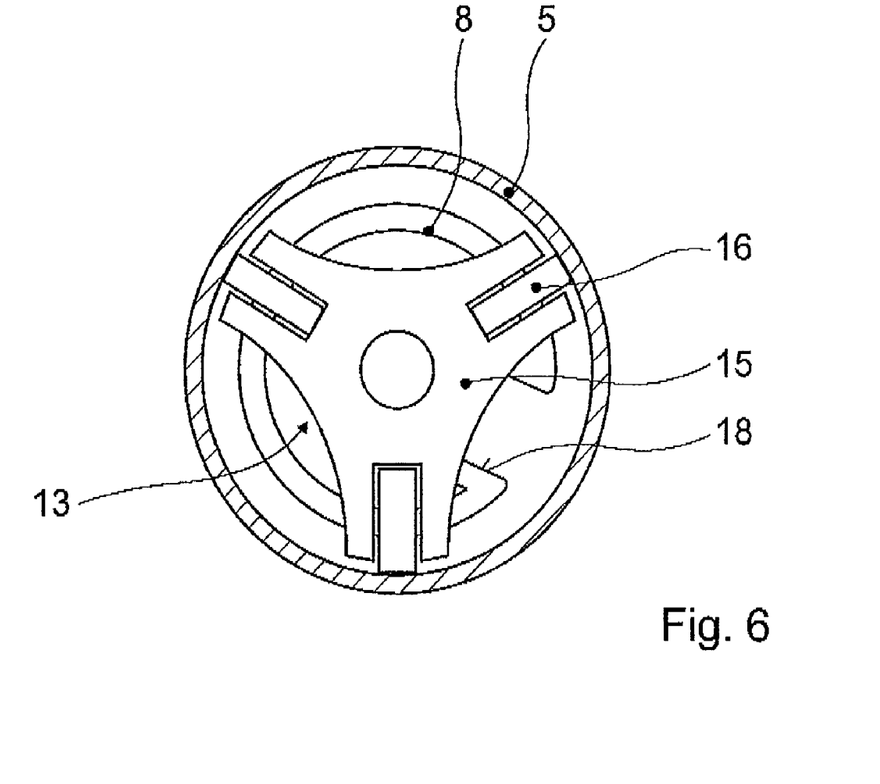
FIG. 6 a top view of the end of a support at the front of the vehicle with a roller bearing.
Figure 7:
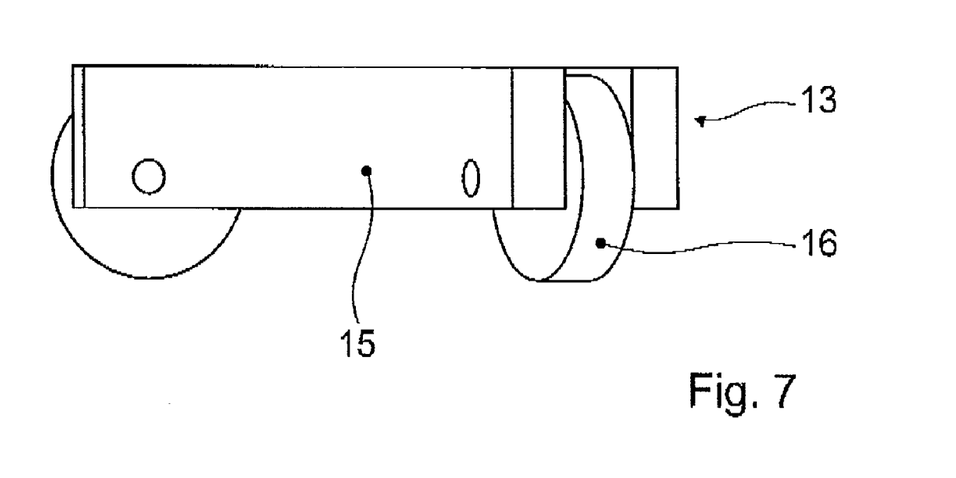
FIG. 7 a three-dimensional lateral view of the roller bearing in FIG. 6 shown separately.

The FIGS. 6 and 7 in particular show in detail that in the shown embodiment, the support 8 has at its end at the front side of the vehicle an at least approximately radial holding means 15 to configure the first roller bearing 13 at the front of the vehicle, with three coplanar roller bearings 16 being held at the teeth of said holding means 15.

The number of rollers 16 running at the interior wall of the receiving channel 12, which in the present case represent wheels formed by a rubber-like material, can vary randomly in embodiments that deviate from the preferred shown three point bearing.

Figure 5:
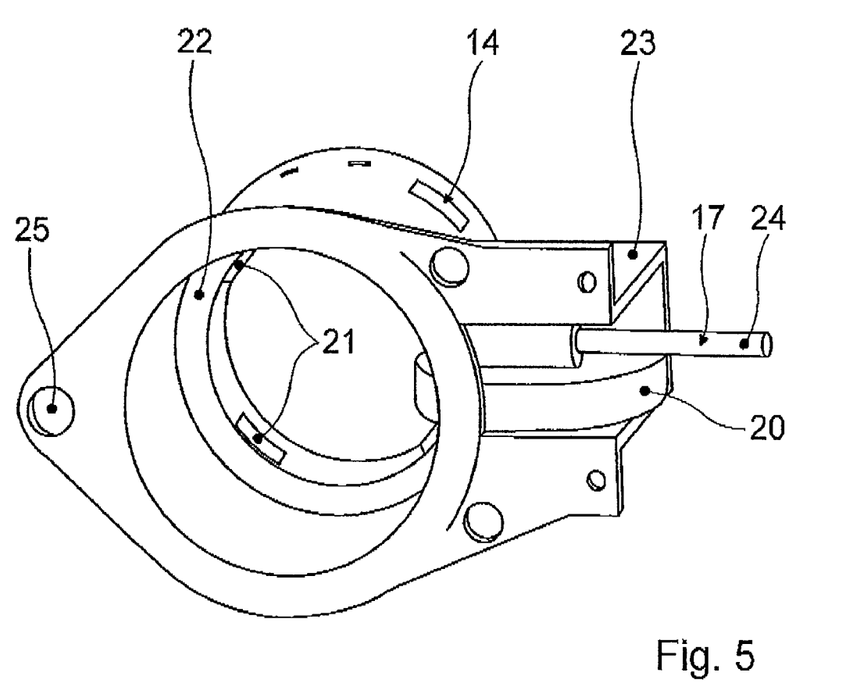
FIG. 5 a three-dimensional detailed view of a sleeve-like housing part of a lateral column of a windshield frame with a roller bearing to guide an assigned support.

FIG. 5 in particular shows that the second roller bearing 14, which is assigned to the exit region where the support 8 exits the lateral column 5, is arranged in the area of a drive means 17 for the support 8. The drive means 17 comprises a toothed batten 18 formed on the support 8 in longitudinal directions of said support and a pinion 20 which engages therewith and can be driven by a drive motor 19.

In the present case, the second roller bearing 14 is formed by four rollers 21 developed as cylinders, which guide the support in the area where it exits the lateral column 5, in addition to the pinion 20 of the drive means 17. The rollers 21 are arranged circularly in a sleeve-like housing part 23 in the area of a shoulder 22 which forms a stop which determines the end position of the support 8 at the rear of the vehicle.

The sleeve-like housing part 23 is usefully development as a separate component which can be fastened at the lateral column 5 of the windshield frame 3 with three screw connections 25, as shown in FIG. 5.

In the embodiments shown above, the electrical drive motor 19 is the central drive motor for both supports 8, which is why it is arranged essentially in a central manner in the motor vehicle at the windshield frame 3 and connected to the respective pinion 20 cooperating with the support 8 through appropriately curved shafts 24 in transverse direction of the vehicle.

In addition to the roller bearing of the supports 8 in the lateral columns 5 of the windshield frame 3, the use of a central drive motor further counteracts a "drawer" effect in the movement of the supports 8 in the lateral columns 5 because the synchronized movement of the two supports 8 avoid a tilting or jamming as a result of a varying drive of the supports.

With an appropriate compulsory synchronization, this effect can also be obtained with the use of two drive motors, if necessary, although this solution requires a greater effort.

Instead of driving the supports 8 with an electrical drive motor, an alternate embodiment may also provide a hydraulic or pneumatic drive. It is also possible to provide the displacement of the supports 8 manually without a drive motor.

In the embodiment of the motor vehicle 1' as a convertible in accordance with FIGS. 3 and 4, the front end area of the movable roof section 7' is connected to a sleeve 27 which partially or completely encompasses the support 8 through an elastically deformable connection 26, which in the present case is a spring steel-sheet.

Alternately, another embodiment may also provide that the movable roof section is connected to the sleeve by means of a steering triangle provided for each side of the motor vehicle with a spherical head bearing at the movable roof section.

In the shown embodiment, the sleeve 27 has a recess through which a pinion 28 can engage with the groove-like tooth batten 18 of the support 8.

The sleeve 27 is held on the support 8 nearly without play and can move longitudinally on said support, thus allowing the longitudinal displacement of the center roof section 7', which hangs on the sleeve 27, by means of a manual drive or drive by the pinion 28. In order to avoid a collision between the center roof section 7' and the roof section 9' located behind said center roof section in the opening movement of the roof 2', a pivotably arranged erector 30 is provided in a lateral frame section 29, which can be pivoted transversely to the longitudinal axis of the lateral frame section to lift the rear section of the roof section 7' when said roof section is displaced to the rear and thus allow the overtravel of the rear roof section 9'. The erector 30 and the pinions 28 are respectively synchronized separately.

Figure 8:
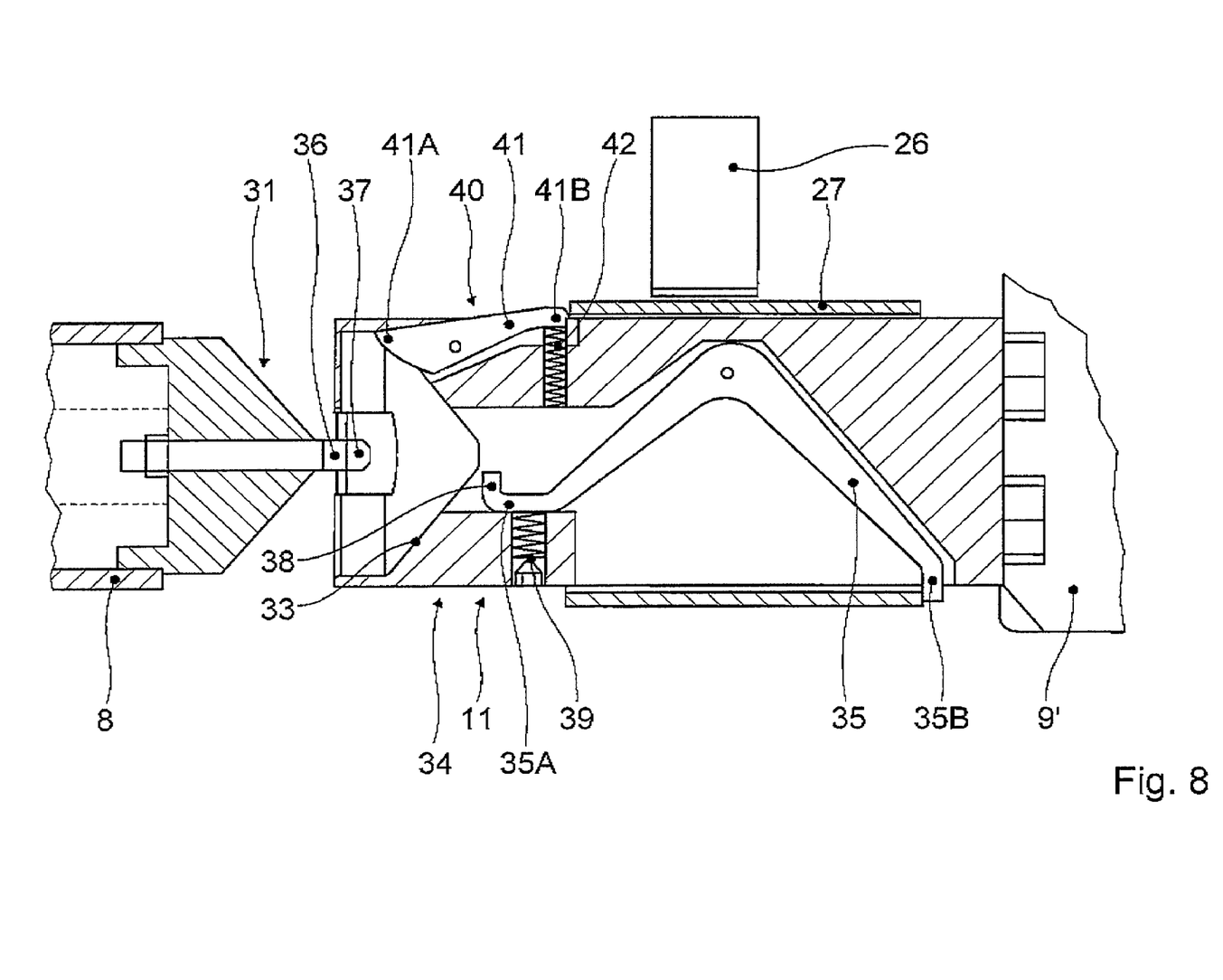
FIG. 8 a diagram of a longitudinal section through the end of a support at the rear of the vehicle and a first embodiment of a fastening element of a locking means at a rear roof section.
Figure 9:
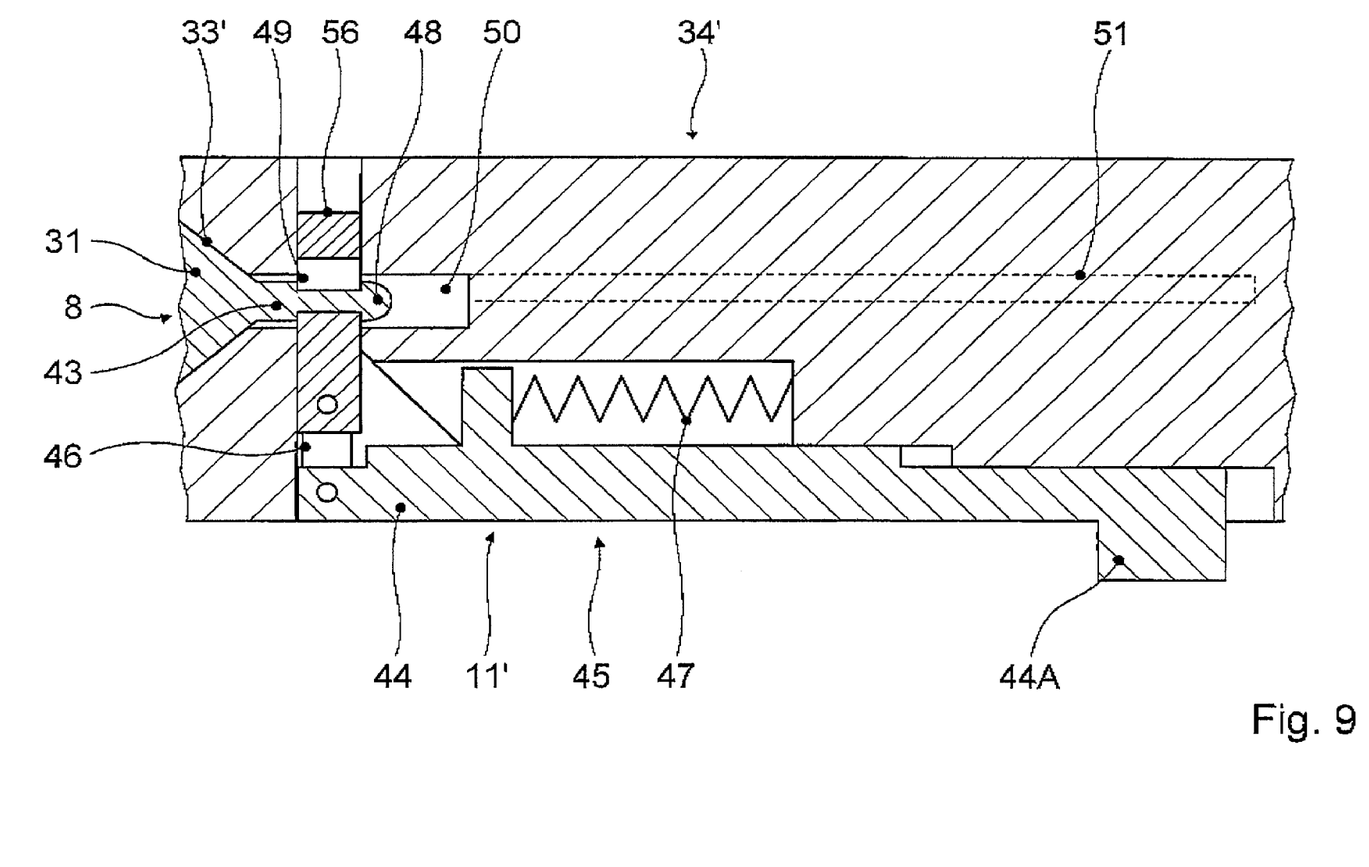
FIG. 9 a diagram of a longitudinal section through the end of the support at the rear of the vehicle according to FIG. 8 and a second embodiment of the fastening element of the locking means at the rear roof section.

The end of the support 8 at the rear of the vehicle has a tapered section 31 which is provided as a receptacle on a first embodiment of the locking means 11 according to FIG. 8 or a second locking means 11' according to FIG. 9 at the rear roof section 9'. In the present case, the tapered section 31 is developed in the simplest manner as a separate component placed on the end of the support 8 at the rear section of the vehicle and riveted thereto. It goes without saying that an expert can also select another suitable configuration here, with a partial spherical form being provided instead of a tapered form.

The locking means 11 and/or 11' is developed with a cylindrical fastening element 34 and/or 34' which essentially represents a cylindrical turning part through which the tapered section 31 can be guided and which has a centering recess—in this case a receiving taper, i.e., recess cone 33 and/or 33'—for the end of the support 8 at the rear of the vehicle.

A rocker-like locking lever 35 is arranged in the fastening element 34 shown in FIG. 8, which is designed to engage in a recess 36 at the tapered end 31 of the support when the locking means 11 is in a locked position. To engage in the recess 36, which in the present case is configured as a crosshole at a screwed-in end extension 37 of the support 8, the locking lever 35 has a hook 38 on its end facing the support 8.

The locking lever 35 is positioned in the fastening element 34 so that it is transferred from a resting position into the locking position when the tapered end 31 of the support 8 is inserted into the receiving taper 33 of the fastening element 34, for which the end 35A of the locking lever 35, which faces the support 8, cooperates with a spring 39, and the end 35B, which faces away from the support 8, cooperates with the sleeve 27, which is guided on the fastening element 34 and connected to the rear roof section 9'.

In non-locking state of the locking means 11, the sleeve 27 is held axially by a detention means 40 at the end facing the support 8. The detention means 40 is developed with a lever element 41 which in the non-locking state of the locking means 11 projects with a first lever end 41A into the receiving taper 33 of the fastening element 34 and is displaced with a second lever end 41B by the force of a conveying spring element 42 into a position that projects over the outer circumference of the cylindrical fastening element 34 and holds the sleeve 27 axially.

When the tapered end 31 of the support 8 is guided into the receiving taper 33 of the fastening element 34, the tapered end 31 of the support 8 applied force to the first lever end 41A of the lever element 41 and causes it to pivot in its pivot point against the force of the spring element 42 so that the second lever end 41B is located within the outer circumference of the fastening element 34 and the sleeve 27 can slide over it in the direction of the support and release the locking lever 35. When the sleeve 27, which is now free to move longitudinally, moves forward and/or in the direction of the support 8, it releases the end 35B of the locking lever 35, which faces away from the support 8, and said locking lever is pivoted by the force of the spring 39 so that the end 35A, which faces the support 8, and the hook 38 are pressed into the recess 36 at the tapered end 31 of the support 8.

In this locked state, the support 8 provides a stable connection between the lateral column 5 of the windshield frame 3, which forms an A-column, and the rear roof section 9.

To unlock the locking means 11, the sleeve 27 is displaced analogously toward the rear of the vehicle, with the sleeve 27 over-traveling the lever element 41 of the detention means 40 and pressing against the end 35B of the locking lever 35 which faces away from the support 8, so that the locking lever 35 and its end 35A, which faces the support 8, is pivoted against the force of the srping 39 out of engagement with the recess 36 at the tapered end 31 of the support 8 and thus releases the support 8.

After the release of the support 8 arranged at both sides of the motor vehicle 1', the roof 2' can be folded to form the roof opening 2A, and the supports 8 can be lowered into the lateral columns 5 of the windshield frame 3. After the support 8 has been lowered into the lateral column 5, it can be locked in the present case by a self-retention of the drive means 17, but it is also possible to provide any other suitable locking means that secure the support 8 in its second end position.

In the embodiment of the locking means 11' according to FIG. 9, the support 8 again has on its end at the rear of the vehicle a tapered or, if applicable, semi-spherical section 31 which is provided for acceptance in a receiving taper 33' of the locking means 11' mounted at the rear roof section 9'. Here too, the receiving taper 33' is developed at a cylindrical fastening element 34', in which a longitudinal slide element 44 connected to a snap element 56 is arranged. When said longitudinal slide element is displaced, the snap element 56 engages in a snap recess 43 at the tapered or semi-spherical end of the support 8 or releases the same.

The snap element 56 and the longitudinal slide element 44 represent components of a joint mechanism 45 which furthermore has a lever 46 that connects said two elements of the joint mechanism 45; in a longitudinal displacement of the longitudinal slide element 44 said lever is provided transversely between the longitudinal slide element 44 and the snap element 56, which is essentially arranged perpendicular thereto, thereby causing the radial displacement of the snap element 56 in its mounted position relative to the fastening element 34'.

The snap element 56 is developed like a cross-slide having a boring 49 that allows the breakthrough of an extension 48 of the support 8 and can be displaced in its mounted position so that it aligns with the boring of a cavity 50, which connects to the receiving taper 33' and is provided to hold the extension 48 of the support 8 in the locked position, or to narrow the cross-section of the boring.

In an unlocking position, the longitudinal slide element 44 is displaced into an end position and/or resting position facing away from the support 8 by the sleeve 27, which presses against a shoulder 44A of the same against the force of a spring 47. In said end position and/or resting position 56, the boring 49 of the snap element 56 essentially aligns with the boring of the cavity 50 and the extension 48 of the support 8 can be introduced into the cavity 50 without obstruction.

To relocate the joint mechanism 45 from said resting position into a locking position in order to achieve a firm connection between the lateral column 5 and the rear roof section 9' through the support 8, the sleeve 27 or another element provided to secure the longitudinal slide element in the resting position is driven into a position that releases the spring 47 which is acting on the joint mechanism 45, which in the present case means a displacement of the sleeve 27 into the direction of the support 8. The spring 47, which was biased earlier but is now relieved, presses the longitudinal slide element 44 into the direction of the support 8. In doing so, the snap element 56 is displaced by the lever 46 from its resting position, where its boring 49 aligns with the receiving boring 50 for the extension 48 of the support 8, into a position that narrows the cross-section of the receiving channel and/or the receiving boring 50.

When the axial extension 48 of the support 8 is developed with a snap recess, as presently a clearance groove 43, and introduced into the cavity 50, the snap element 56 engages in the snap recess and/or clearance groove 43 at the axial extension 48 of the support 8 and thus locks the support 8 in the fastening element 34'. This state is principally shown in FIG. 9.

The sleeve 27 is guided at the fastening element 34 and/or 34 along a groove 51 outlined as an example in FIG. 9, which has a tooth profile that corresponds to the tooth batten 18 of the support 8 and aligns with the tooth batten 18 of the support 8 over the groove 51 of the fastening element 34 and/or 34' as well as the tooth batten 18 of the support 8.

It goes without saying that an alternate embodiment may also provide that the sleeve has a corresponding groove and can be guided with same along a guide rail at the support and the fastening element. In both cases, the groove guidance system has the advantage of being torsion-proof.

In the shown embodiment, another identically developed groove is shown at the support 8 and at the fastening element 34 and/or 34' in mirror image to the outlined groove 51, and thus both of the lateral supports 8 and the fastening elements 34 and/or 34' represent so-called identical parts which can be used at either side of the vehicle. By developing said components as identical part, the cost of the roof 2 and/or 2' can be lowered significantly.

For the automated opening and closing of the roof 2', the sleeves 27 assigned to the supports 8 and the roof section 7' connected thereto are driven by motor. To that end, a servo motor 52, which is indicated in schematic representation in FIG. 4, is arranged at the movable roof section 7' and can be triggered wirelessly through radio or ultrasound to open and close the roof 2', and has an accumulator 53 that is charged when the roof section 7 abuts the windshield frame 3.

In an alternate development of the servo motor 52, a conductor path 54, which is arranged at the supports 8 in the running direction of the sleeve and may represent a cooper rail, for example, can be loaded by the drive motor 19 with current which is picked off at the sleeve 27 by a contact element 55 developed as a sliding contact and conducted to the servo motor 52 in the roof section 7'. Grounding can be achieved at the respective other side of the motor vehicle. With the latter development, the running direction of the servo motor 52 can be changed by changing the polarity by means of a relay.

The mechanical connection between the servo motor 52 and the pinon 28 which respectively punches through the sleeve 27 can be achieved in the known manner by a curved shaft.

It goes without saying that the developments described herewith respect to the development of the motor vehicle 1' as a convertible may also, if necessary and with appropriate adaptation, be used in the development of the motor vehicle 1 as a Targa motor vehicle.

REFERENCE SYMBOLS

1, 1' Motor vehicle
2, 2' Roof
2A Roof opening
3 Windshield frame
4 Windshield
5 Lateral column
6 Cross-frame component
7, 7' Center movable roof section
8, 8' Support(s)
9, 9' Rear roof section
10 Rear windshield
11 Locking means
12 Receiving channel
13 First roller bearing
14 Second roller bearing
15 Holding means
16 Rollers
17 Drive means
18 Tooth batten
19 Drive motor
20 Pinion
21 Rollers
22 Shoulder
23 Sleeve-like housing part
24 Shaft
25 Screw connection
26 Elastic connection, spring steel sheet
27 Sleeve
28 Pinion
29 Frame part
30 Erector
31 End of support at the rear of the vehicle
32 Pivot axis
33, 33' Centering recess, receiving taper
34, 34' Fastening element
35 Locking lever
35A First end of the locking lever
35B Second end of the locking lever
36 Recess
37 End extension
38 Hook
39 Spring
40 Detention means
41 Lever element
41A First lever element end
41B Second lever element end
42 Spring element
43 Clearance groove
44 Longitudinal slide element
44A Shoulder
45 Joint mechanism
46 Lever
47 Spring
48 Extension
49 Boring
50 Cavity
51 Groove
52 Servo motor
53 Accumulator
54 Conductor
55 Contact element
56 Snap element

The invention claimed is:

1. Motor vehicle having at least one displaceable roof section which when closed abuts a windshield frame at the front of the vehicle and has lateral outer areas that respectively abut a support, with at least part of the supports being displaceable in lateral columns of the windshield frame to form an open roof section,
   wherein the supports are guided in a receiving channel formed by the assigned lateral column of the windshield frame in the area of the end of said supports at the front of the vehicle and in the area of said supports lying in the exit region from the upper end of the lateral column, respectively by means of a roller bearing without play and at a defined distance from the wall of the receiving channel.

2. Motor vehicle in accordance with claim 1,
   wherein the end of the support at the front of the vehicle has at least one approximately radial holding means to form the roller bearing at the front of the vehicle, which supports preferably three coplanar rollers.

3. Motor vehicle in accordance with claim 1, wherein the end of the support at the rear of the vehicle is developed as a tapered- or semi-spherical area.

4. Motor vehicle in accordance with claim 1, wherein the supports are developed as identical parts.

5. Motor vehicle in accordance with claim 1, wherein the support is preferably detained by an irreversibility of the drive means after the support is lowered into the lateral column.

6. Motor vehicle in accordance with claim 1, wherein a central drive motor is provided for both supports, with the drive motor being connected in transverse direction to the vehicle with the respective pinion cooperating with the support.

7. Motor vehicle in accordance with claim 1, wherein the roller bearing assigned to the area where the support exits the lateral column is arranged in the area of a drive means for the support.

8. Motor vehicle in accordance with claim 7, wherein that the drive means comprises a tooth batten arranged on the support in longitudinal direction of said support and a pinion that cooperates therewith and can be driven by a drive motor.

9. Motor vehicle in accordance with claim 8, wherein the support in the area where it exits the lateral column is guided by at least two rollers of the roller bearing assigned to the exit area and the pinion of the drive means.

10. Motor vehicle in accordance with claim 8, wherein the roller bearing assigned to the exit area and the pinion of the drive means are arranged in a sleeve-like housing part that forms a stop for the support.

11. Motor vehicle in accordance with claim 10, wherein the sleeve-like housing part represents a separate component which can be mounted at the respective lateral column of the windshield frame.

12. Motor vehicle in accordance with claim 1,
wherein at the end of the support in the rear of the vehicle, the support is provided to be held in a centered manner on a locking means at a rear roof section, with the locking means being developed with a cylindrical fastening element comprising a centering recess in which a longitudinal slide element connected to a snap-in element is arranged, and with the displacement of said longitudinal slide element causing the snap-in element to engage in a snap-in recess at the end of the support at the rear of the vehicle, or releasing said recess.

13. Motor vehicle in accordance with claim 12,
wherein the snap-in cavity is developed as a clearance groove on an axial extension in the area of the end of the support at the rear of the vehicle.

14. Motor vehicle in accordance with claim 12, wherein the fastening elements assigned to the two lateral supports are developed with two each grooves arranged in mirror fashion as identical parts.

15. Motor vehicle in accordance with claim 12, wherein the centering recess of the fastening element is developed as a receiving taper.

16. Motor vehicle in accordance with claim 12,
wherein when the end of the support at the rear of the vehicle is introduced into the fastening element and the longitudinal slide element is displaced, the snap-in element is transferred by a joint mechanism from a resting position into the locking position in that a spring acting on a first point of force application at the joint mechanism is released and presses the snap-in element into the snap-in recess at the end of the support at the rear of the vehicle.

17. Motor vehicle in accordance with claim 16,
wherein the point of force application of the spring is developed on the longitudinal slide element, which in a non-locking state is held against the force of the spring by a sleeve that is guided on the fastening element and rotatably mounted to the rear roof section, with the sleeved being displaced in the direction of the support after the end of the support at the rear of the vehicle is introduced into the centering recess and thus releases the longitudinal slide element of the joint mechanism, which presses the snap-in element into a snap-in recess on the support with the force of the spring through a lever.

18. Motor vehicle in accordance with claim 12, wherein a servo motor arranged at the roof section is provided to drive the sleeves guided on the fastening elements and the roof section connected thereto, which can be connected by an accumulator with a conductor at the supports.

19. Motor vehicle in accordance with claim 18, wherein that the conductor at the supports is developed as a conductor path carrying current in the area of the lateral column of the windshield frame and the contact element is developed as a rubbing contact.

20. Motor vehicle in accordance with claim 1,
wherein the end of the support at the rear of the vehicle is provided to be accommodated in a centered manner at a locking means in a rear roof section, with the locking means being developed with a cylindrical fastening element having a centering recess, in which a rocker-mounted locking lever is arranged, which is designed to engage in a recess at the end of the support at the rear side of the vehicle in a locking position.

21. Motor vehicle in accordance with claim 20, wherein that the locking lever is transferred from a resting position into the locking position when the end of the support at the rear of the vehicle is introduced into the centering recess of the fastening element.

22. Motor vehicle in accordance with claim 21,
wherein the locking lever cooperates on the end of the locking lever that faces the support with a spring and on the end of the locking lever that faces away from the support with a sleeve which is guided on the fastening element and rotatably connected to the rear roof section, with the sleeve being released for longitudinal displacement when the end of the support at the rear of the vehicle is introduced into the centering recess of the fastening element and thus releases the locking lever which is pressed by the force of the spring into the recess at the end of the support lying in the rear of the vehicle.

23. Motor vehicle in accordance with claim 22, wherein a servo motor is arranged on the roof section to drive the sleeves guided on the fastening elements and the roof section connected thereto, and said servo motor can be triggered wirelessly and has an accumulator which preferably can be charged when the roof section abuts the windshield frame.

24. Motor vehicle in accordance with claim 22, wherein when the locking means is in an unlocked state, the sleeve is held axially by a detention means which cooperates with a spring element and upon introduction of the end of the support is moved into a position that releases the axial movement of the sleeve.

25. Motor vehicle in accordance with claim 24,
wherein the detention means is developed with a lever element which, when the locking means is in a non-locking state, projects with a first lever end into the centering recess of the fastening element and with a second lever end which is displaced by the force of the spring element into a position projecting over the outer circumference of the fastening element and holds the sleeve axially, and which, when the locking means is in a locked state, is pivoted by a force exerted by the end of the support at the rear of the vehicle on the first lever end against the force of the spring element so that the second lever element is located within the outer circumference of the fastening element.

26. Motor vehicle in accordance with claim 22, wherein the sleeve is guided on the fastening element along a groove that runs in the longitudinal direction of the fastening element.

27. Motor vehicle in accordance with claim 26, wherein the groove formed on the fastening element is in alignment with the tooth batten on the support, with the sleeve being guidable over the groove of the fastening element and the tooth batten of the support.

* * * * *